(12) United States Patent
Shekhawat

(10) Patent No.: US 7,834,597 B1
(45) Date of Patent: Nov. 16, 2010

(54) SYSTEM AND METHOD FOR AC VOLTAGE REGULATION

(75) Inventor: Sampat Shekhawat, Mountaintop, PA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 2 days.

(21) Appl. No.: 12/229,543

(22) Filed: Aug. 25, 2008

Related U.S. Application Data

(60) Provisional application No. 60/966,071, filed on Aug. 24, 2007.

(51) Int. Cl.
G05F 1/613 (2006.01)
(52) U.S. Cl. .................................. 323/224; 323/239
(58) Field of Classification Search .............. 323/224, 323/239
See application file for complete search history.

(56) References Cited

U.S. PATENT DOCUMENTS 6,771,056 B1 * 8/2004 Lindemann .................. 323/324

* cited by examiner

Primary Examiner—Shawn Riley
(74) Attorney, Agent, or Firm—Sidley Austin LLP

(57) ABSTRACT

In an embodiment, a power converter system is provided for AC voltage regulation. The power converter system receives an AC input voltage at an input terminal and provides an AC output voltage to a load at an output terminal. A main bi-directional switch is coupled between the input terminal and the output terminal. The main bi-directional switch is operable to control the provision of the AC output voltage. A reactive current flows through the main bi-directional switch if the load is reactive. An auxiliary bi-directional switch is coupled to the output terminal. The auxiliary bi-directional switch is operable to circulate the reactive current due to the reactive load, thereby reducing any voltage spikes in the power converter system.

19 Claims, 6 Drawing Sheets

SYSTEM AND METHOD FOR AC VOLTAGE REGULATION

CROSS-REFERENCE TO RELATED APPLICATION AND CLAIM OF PRIORITY

The present application claims the benefit of priority to U.S. Provisional Patent Application Ser. No. 60/966,071, filed Aug. 24, 2007, entitled, "AC/AC Chopper Controls AC Voltage with Controlled Harmonics and Reduces Filter Size," the entirety of which is incorporated by reference herein.

BACKGROUND

1. Field of Invention

The present invention relates to power conversion, and more particularly, to a system and method for alternating current (AC) voltage regulation.

2. Description of Related Art

Power converters are essential for many modern electronic devices. Among other capabilities, power converters can adjust power level downward (buck converter) or adjust power level upward (boost converter). Power converters may also convert from alternating current (AC) power to direct current (DC) power, or vice versa. Further, power converters can regulate power, for example, voltage regulation of DC to DC or AC to AC. An AC-to-AC voltage regulator can produce a controlled AC output voltage from a varying AC input voltage.

Previously developed AC-to-AC voltage regulators may employ a bi-directional switch for providing the controlled AC output. Such bi-directional switch may comprise one or more devices such as silicon controlled rectifiers (SCRs) or thryristors, or transistors (e.g., IGBTs or MOSFETs) and diodes. If the bi-directional switch is implemented with SCRs, then the AC-to-AC voltage regulator can only use a single pulse leading edge control scheme. This type of control will generate very high total-harmonics-distortion (THD).

THD can be reduced by controlling the bi-directional switch with pulse width modulation (PWM) to "chop" the AC input waveform during, for example, one half cycle for an AC-to-AC voltage regulator. For this case, thryristors or SCRs cannot be used for the bi-directional switch. Instead, the bi-directional switch must be implemented using transistors. Ideally, if the load is resistive only and line reactance is zero, then multiple chopping can be performed on the AC input waveform without problem. However, no ideal load exists in the real world and there will always be line inductance. This generates very high voltage spikes across the transistors in the bi-directional switch. The voltage spikes produce a lot of electromagnetic interference (EMI) and distortion and, even worse, can cause the transistors in the bi-directional switch to avalanche, ultimately destroying them.

SUMMARY

Briefly and generally, embodiments of the invention include a static voltage regulator using AC chopping scheme.

According to an embodiment of the present invention, a power converter system is provided for AC voltage regulation. The power converter system receives an AC input voltage at an input terminal and provides an AC output voltage to a load at an output terminal. A main bi-directional switch is coupled between the input terminal and the output terminal. The main bi-directional switch is operable to control the provision of the AC output voltage. A reactive current flows through the main bi-directional switch if the load is reactive. An auxiliary bi-directional switch is coupled to the output terminal. The auxiliary bi-directional switch is operable to circulate the reactive current due to the reactive load, thereby reducing any voltage spikes in the power converter system.

According to another embodiment of the present invention, in a power converter system, a method for AC voltage regulation includes the following: receiving an AC input voltage at an input terminal; controlling the provision of an AC output voltage to a load at an output terminal using a main bi-directional switch coupled between the input terminal and the output terminal, wherein a reactive current flows through the main bi-directional switch if the load is reactive; and circulating the reactive current due to the reactive load through an auxiliary bi-directional switch coupled to the output terminal, thereby reducing any voltage spikes in the power converter system.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1 through 6 of the drawings. Like numerals are used for like and corresponding parts of the various drawings.

In various embodiments, the present invention provides systems and methods for AC voltage regulation. In some embodiments, the systems and methods employ an AC chopper circuit which allows for controlled harmonics. The systems and methods also can reduce filter size for a static voltage regulator (e.g., AC/AC regulator). The systems and methods may reduce voltage stress of line inductance and reactive current at a chopper bi-directional switch. In some embodiment, the AC chopper circuit, includes a main bi-directional switch and an auxiliary bi-directional switch.

Figure 1:
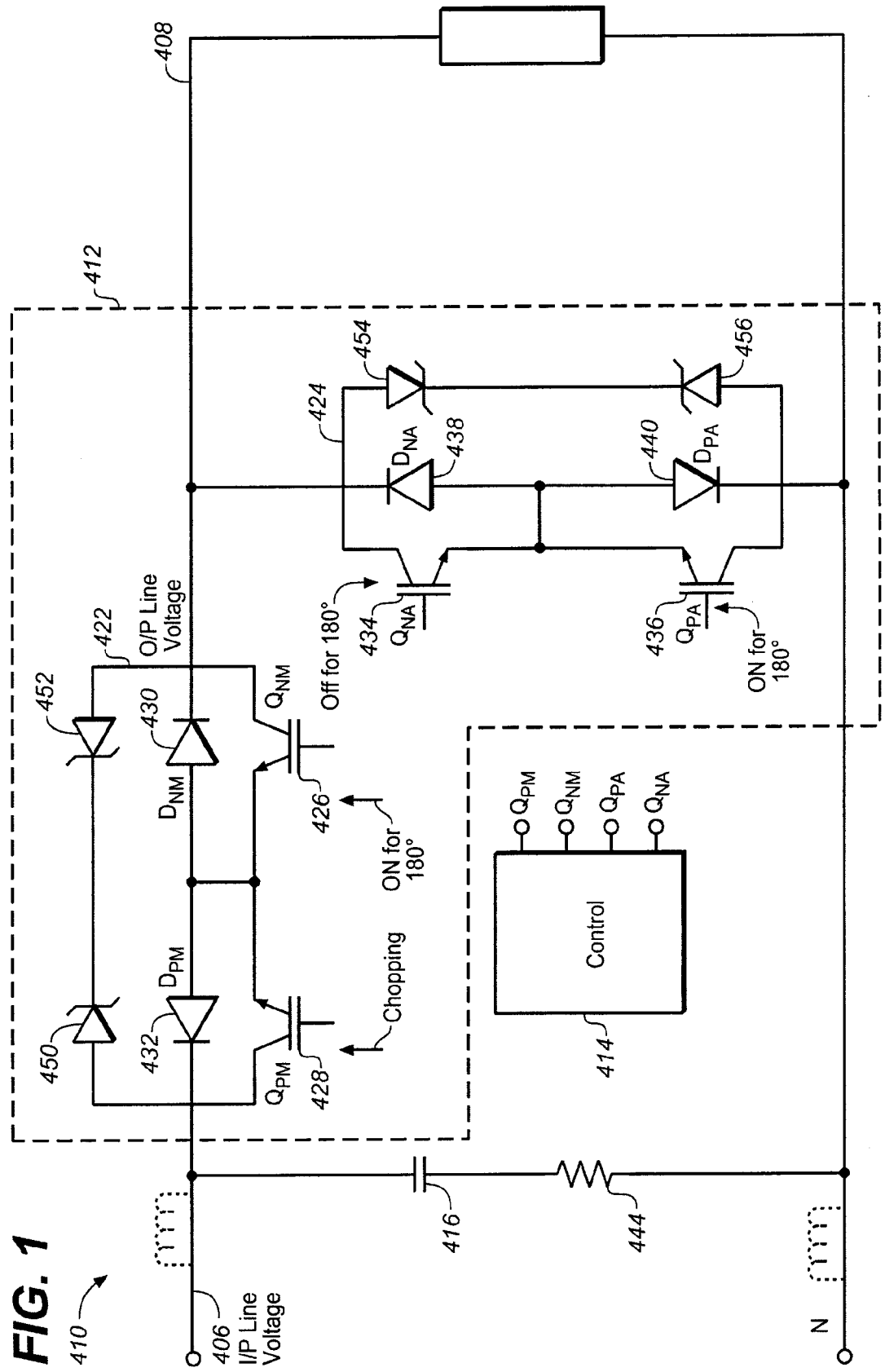
FIG. 1 is a schematic diagram of an exemplary implementation for a power converter system with an improved AC/AC chopper circuit, according to an embodiment of the invention.

FIG. 1 is a schematic diagram of an exemplary implementation for a power converter system 410 for AC voltage regulation, according to an embodiment of the invention. Such power converter system 410 can be an AC-to-AC voltage regulator for regulating AC power. Power converter system 410 receives an AC input power from an AC power source at an input terminal 406, and delivers a controlled AC output power to a load at an output terminal 408. As shown, system 410 includes a chopper block 412, a control block 414, an input capacitor 416, and a resistor 444.

The chopper block 412 generally functions to support or provide control of the AC output voltage at least in part by "chopping" the AC input waveform. This is accomplished through pulse width modulation (PWM) control. PWM is a technique which is commonly employed to vary the width of the pulse in a periodic signal for turning on and off the switching devices in a power converter. With PWM, the frequency is held constant and the width of each pulse is varied to form a fixed-frequency, variable-duty cycle operation.

As shown, the chopper block 412 comprises a main bi-directional switch 422 and an auxiliary bi-directional switch 424. Main bi-directional switch 422 functions to support or provide control of the AC output voltage. In this embodiment, main bi-directional switch 422 may be implemented with transistors 426, 428 (labeled Qnm and Qpm), diodes 430 or 432 (labeled Dnm and Dpm), and diodes 450, 452 (which can be Zener diodes or Transient Voltage Suppressors (Transorbs)). Transistors 426 and 428 are coupled in series, and each receive its own control signal. Auxiliary bi-directional switch 424 functions to handle the reactive load by circulating current. Similar to main bi-directional switch 422, auxiliary bi-directional switch 424 may be implemented with transistors 434, 436 (labeled Qna and Qpa), diodes 438, 440 (labeled Dna and Dpa), and diodes 454, 456 (which can be Zener diodes or Transorbs). Transistors 434 and 436 are coupled in series, and each receives its own control signal. Each of transistors 426, 428, 434, 436 in main and auxiliary bi-directional switches 422, 424 can be implemented as any suitable transistor, such as IGBTs shown in FIG. 1, but alternatively, BJTs, IGFETs, MOSFETs, etc. The current rating of auxiliary or free wheeling bi-directional switch 424 will generally be less than that of main bi-directional switch 422.

Control block 414 is coupled to main and auxiliary bi-directional switches 422, 424. As used herein, the terms "connected" or "coupled," or any variant thereof, covers any connection or coupling, either direct or indirect, between two or more elements. Control block 414 provides a separate control signal for each of transistors 426, 428, 434, 436 for turning on and off the same. The control provided by control block 414 can be PWM control for at least some of the transistors. Control block 414 may be implemented in any suitable logic for providing control signals for turning on and turning off transistors 426, 428, 434, 436 as described herein.

In operation, in one embodiment, the transistors 426, 428 in main bi-directional switch 422 are turned on and off to generate a controlled AC output voltage from the AC input voltage. PWM control may be employed to "chop" the AC input waveform during both half-cycles for the power converter system 410, thus reducing or helping to control THD and voltage at the output of power converter system 410.

During each positive half-cycle for the power converter system 410, transistor 426 is turned on; and a PWM control signal is applied to transistor 428 to turn it on and off. When transistor 428 is turned on and current flow is negative (flowing from AC output voltage to AC input voltage) through transistor 426 and diode 432. Conversely, when transistor 428 is turned off and current flow is positive (flowing from AC input voltage to AC output voltage), the reactive current flows through transistor 436 and diode 438. In auxiliary bi-directional switch 424, transistor 436 is turned on and transistor 434 is turned off. Transistor 436 and diode 438 circulate the positive current when transistor 428 is turned off. Thus, the reactive load current is allowed to free wheel through the auxiliary bi-directional switch 424, thereby reducing any voltage spikes in power converter system 410 to a safe limit. The voltage spike due to input voltage source impedance is taken care of by snubber circuit implemented by capacitor 416 and resistor 444 and also transorbs or Zener diodes 450 and 452.

During each negative half-cycle for the power converter system 410, transistor 428 is turned on; and a PWM control signal is applied to transistor 426 to turn it on and off. When transistor 426 is turned on and current flow is positive (flowing from AC input voltage to AC output voltage), the reactive current flows through transistor 428 and diode 430. Conversely, when transistor 426 is turned off and current flow is negative, the reactive current flows through transistor 434 and diode 440. In auxiliary bi-directional switch 424, transistor 434 is turned on and transistor 436 is turned off. Transistor 434 and diode 440 circulate the positive reactive current.

By adding auxiliary or free wheeling bi-directional switch 424, the effect of reactive load and cable parasitic inductance can be reduced or eliminated in power converter system 410 as compared to previously developed designs. The snubber circuit (of input capacitor 416 and resistor 444) will also help to reduce voltage spikes across main bi-directional switch 422 when this switch turns off. The embodiment of power converter system 410 thus reduces or eliminates some of the back EMF problem for lagging or leading load. Furthermore, the power converter system 410 may control AC output voltage with controlled harmonics and reduced output filter size.

Figure 2:
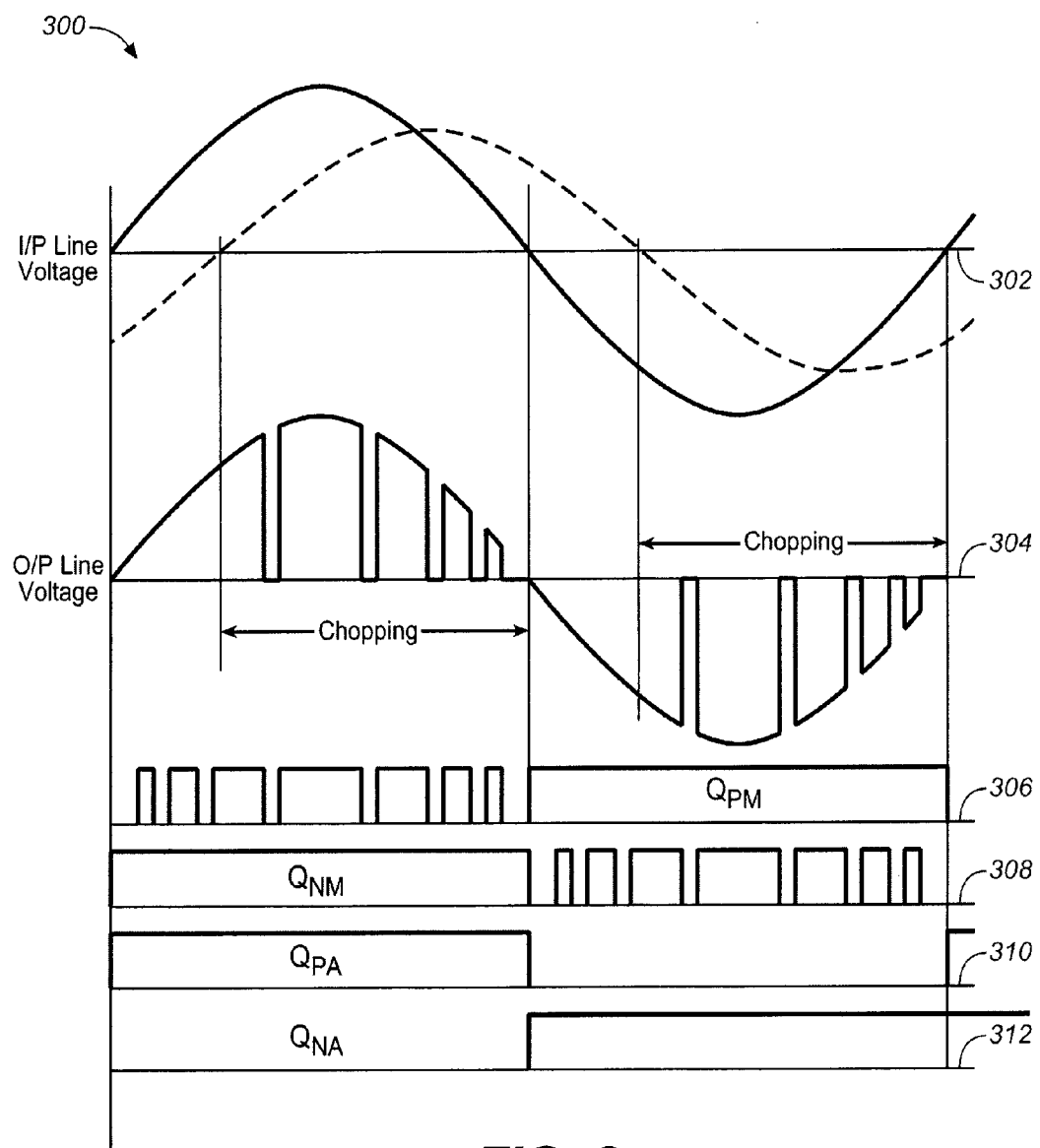
FIG. 2 is an exemplary waveform diagram for a power converter system for AC voltage regulation, according to an embodiment of the invention.

FIG. 2 is an exemplary waveform diagram 300 which is applicable for the power converter system 410 shown in FIG. 1, according to an embodiment of the invention. Waveform diagram 300 has waveforms 302, 304, 306, 308, 310, and 312, which generally represent, respectively, the input line voltage and current at input terminal 406, the chopped output voltage at output terminal 408, the control signal applied to transistor 428 (Qpm), the control signal applied to transistor 426 (Qnm), the control signal applied to transistor 436 (Qpa), and the control signal applied to transistor 434 (Qna).

As shown, chopping is only achieved for a portion of each half-cycle of operation in power converter system 410. This is because reactive current is flowing back to the input voltage source through main bi-directional switch 422

Figure 3:
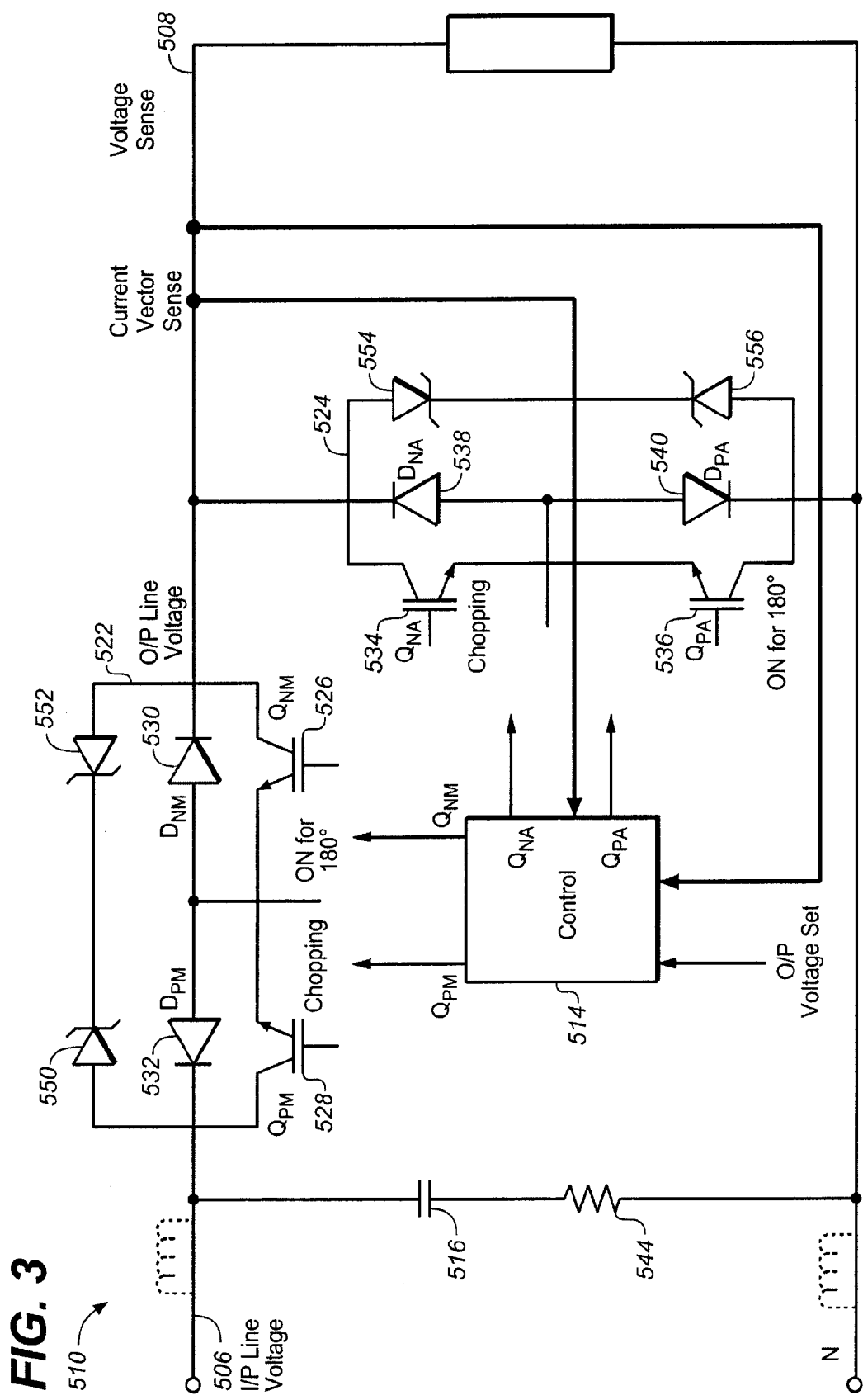
FIG. 3 is a schematic diagram of another exemplary implementation for a power converter system for AC voltage regulation, according to an embodiment of the invention.

FIG. 3 is a schematic diagram of another exemplary implementation for a power converter system 510 for AC voltage regulation, according to an embodiment of the invention. Power converter system 510 receives an AC input power from an AC power source at an input terminal 506, and delivers a controlled AC output power to a load at an output terminal 508. Power converter system 510 shown in FIG. 3 is similar to power converter system 410 shown in FIG. 1. Like system 410, system 510 includes a chopper block 512, a control block 514, an input capacitor 516, and a resistor 544. System 510 also includes circuitry for sensing the current vector and output voltage.

The chopper block 512, which generally functions to support or provide control of the AC output voltage at least in part by "chopping" the AC input waveform, comprises a main bi-directional switch 522 and an auxiliary bi-directional switch 524. In this embodiment, main bi-directional switch 522 may be implemented with transistors 526, 528 (labeled Qnm and Qpm), diodes 530 or 532 (labeled Dnm and Dpm), and diodes 450, 452 (which can be Zener diodes or Transorbs). Transistors 526 and 528 are coupled in series, and each receive its own control signal. Similarly, auxiliary bi-directional switch 524 may be implemented with transistors 534, 536 (labeled Qna and Qpa), diodes 538, 540 (labeled Dna and Dpa), and diodes 554, 556 (which can be Zener diodes or Transorbs). Transistors 534 and 536 are coupled in series, and each receives its own control signal. Each of transistors 526, 528, 534, 536 in main and auxiliary bi-directional switches 522, 524 can be implemented as any suitable transistor, such as IGBTs shown in FIG. 2, but alternatively, BJTs, IGFETs, MOSFETs, etc.

Control block 514 is coupled to main and auxiliary bi-directional switches 522, 524. Control block 514 provides a separate control signal for each of transistors 526, 528, 534, 536 for turning on and off the same. The control provided by control block 514 can be PWM control for at least some of the transistors. In one embodiment, control block 514 applies PWM control signals to each of the transistors 526, 528, 534, 536 during some point of operation; thus, there is chopping for both the main and auxiliary bi-directional switches 522, 524. This allows for more flexible and intelligent control of bi-directional switches 522, 524, and hence, power converter system 510. Control block 514 is coupled to receive as feedback signals for sensing current vector and output voltage. The current vector sensing circuitry helps to control auxiliary bi-directional switch 524. The current vector sensing signal indicates or is representative of the direction of current flow in the system 510 and the load. The voltage sensing signal indicates or is representative of the magnitude of the output voltage in the system 510. Control block 514 uses the voltage sensing signal for controlling the main bi-directional switch 522 to regulate the output voltage in sinusoidal fashion. Control block 514 uses the current vector and output voltage sensing signal for controlling and chopping the auxiliary bi-directional switch 524 also. Control block 514 may be implemented in any suitable logic for providing control signals for turning on and turning off transistors 526, 528, 534, 536 as described herein.

In operation, in one embodiment, the transistors 526, 528 in main bi-directional switch 522 are turned on and off to generate a controlled AC output voltage from the AC input voltage. PWM control may be employed to "chop" the AC input waveform during the entirety of each half-cycle for the power converter system 510, thus reducing or helping to control THD and EMF in system 510.

During each positive half-cycle for the power converter system 510, transistor 526 is turned on; and a PWM control signal, responsive to the voltage sense feedback signal, is applied to transistor 528 to turn it on and off. When transistor 528 is turned on and current can be negative (flowing from AC output voltage to AC input voltage), the reactive current flows through transistor 526 and diode 532. In auxiliary bi-directional switch 524, transistor 536 is turned on. When current direction is negative, transistor 534 is turned off and on with a PWM control signal complimentary to transistor 528, thus maintaining the chopped output voltage and reducing THD. Once the current direction reverses to positive (as indicated by current vector sense signal), transistor 534 is kept off until the last PWM pulse command in this positive half-cycle. Transistor 536 and diode 538 circulate the positive current when transistor 528 is turned off. Thus, the reactive load current is allowed to free wheel through the auxiliary bi-directional switch 524, thereby reducing any voltage spikes in power converter system 510 to a safe limit.

The reverse happens during negative half-cycle. In particular, during each negative half-cycle for the power converter system 510, transistor 528 is turned on; and a PWM control signal, responsive to the voltage sense feedback signal, is applied to transistor 526 to turn it on and off. When transistor 526 is turned on and current flow is positive (flowing from AC input voltage to AC output voltage), the reactive current flows through transistor 528 and diode 530. In auxiliary bi-directional switch 524, transistor 534 is turned on; and transistor 536 is turned on and off with a PWM control signal while current flow is positive, thereby maintaining the chopped output voltage and reducing THD. Once the current reverses direction to negative (as indicated by current vector sense signal), transistor 536 is kept off until the last PWM pulse command in this negative half-cycle. Transistor 534 and diode 540 also circulate the negative current when transistor 526 is turned off. Thus, the reactive load current is allowed to free wheel through the auxiliary bi-directional switch 524, thereby reducing any voltage spikes in power converter system 510 to a safe limit.

Figure 4:
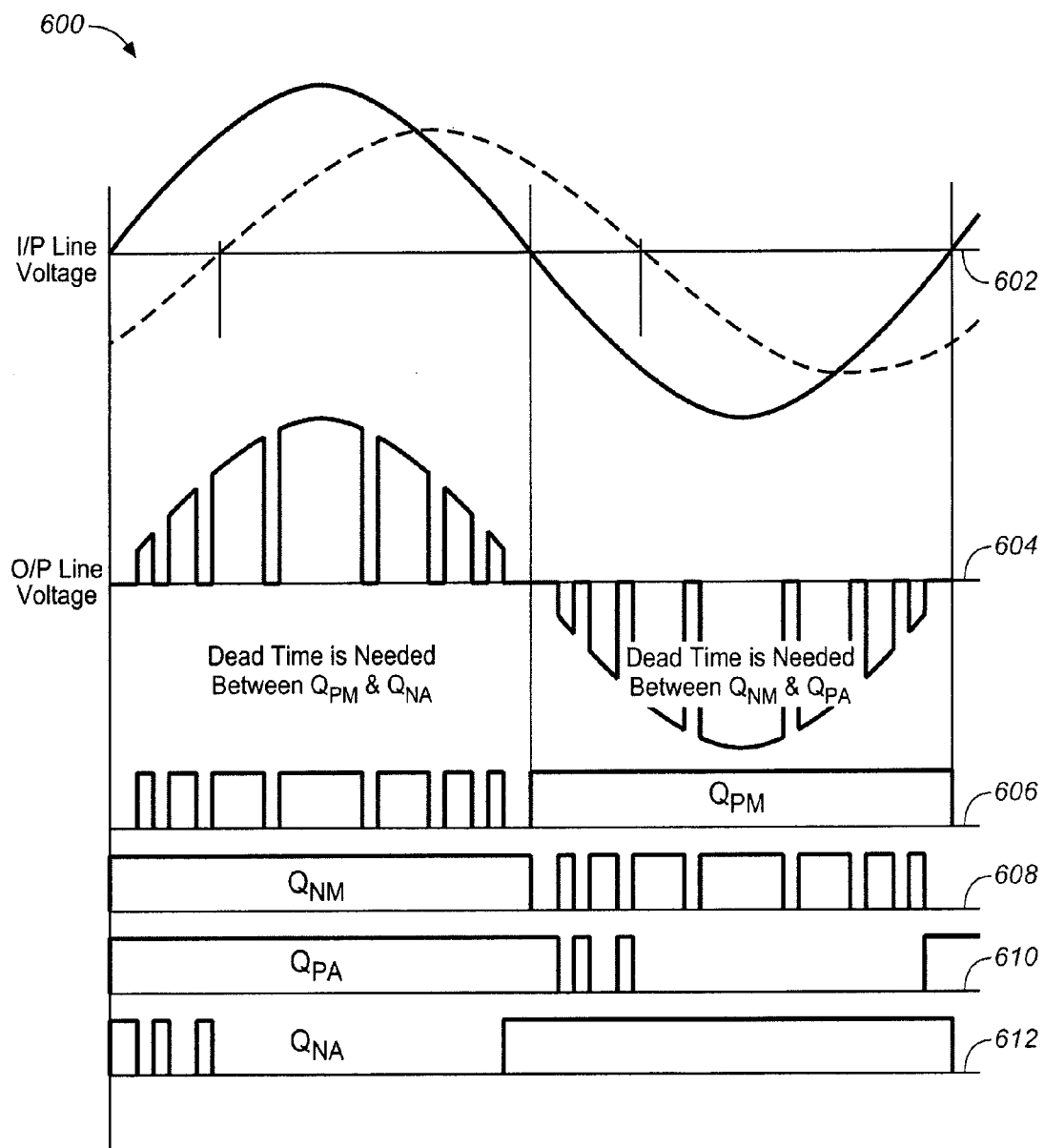
FIG. 4 is an exemplary waveform diagram for a power converter system for AC voltage regulation, according to an embodiment of the invention.

FIG. 4 is an exemplary waveform diagram 600 which is applicable for the power converter system 510 shown in FIG. 3, according to an embodiment of the invention. Waveform diagram 600 has waveforms 602, 604, 606, 608, 610, and 612, which generally represent, respectively, the input line voltage and current at input terminal 506, the chopped output line voltage at output terminal 508, the control signal applied to transistor 528 (Qpm), the control signal applied to transistor 526 (Qnm), the control signal applied to transistor 536 (Qpa), and the control signal applied to transistor 534 (Qna).

As shown, chopping is achieved throughout each cycle of operation in power converter system 510. This is because of auxiliary bi-directional switch 524 chopping pursuant to current direction control.

Figure 5:
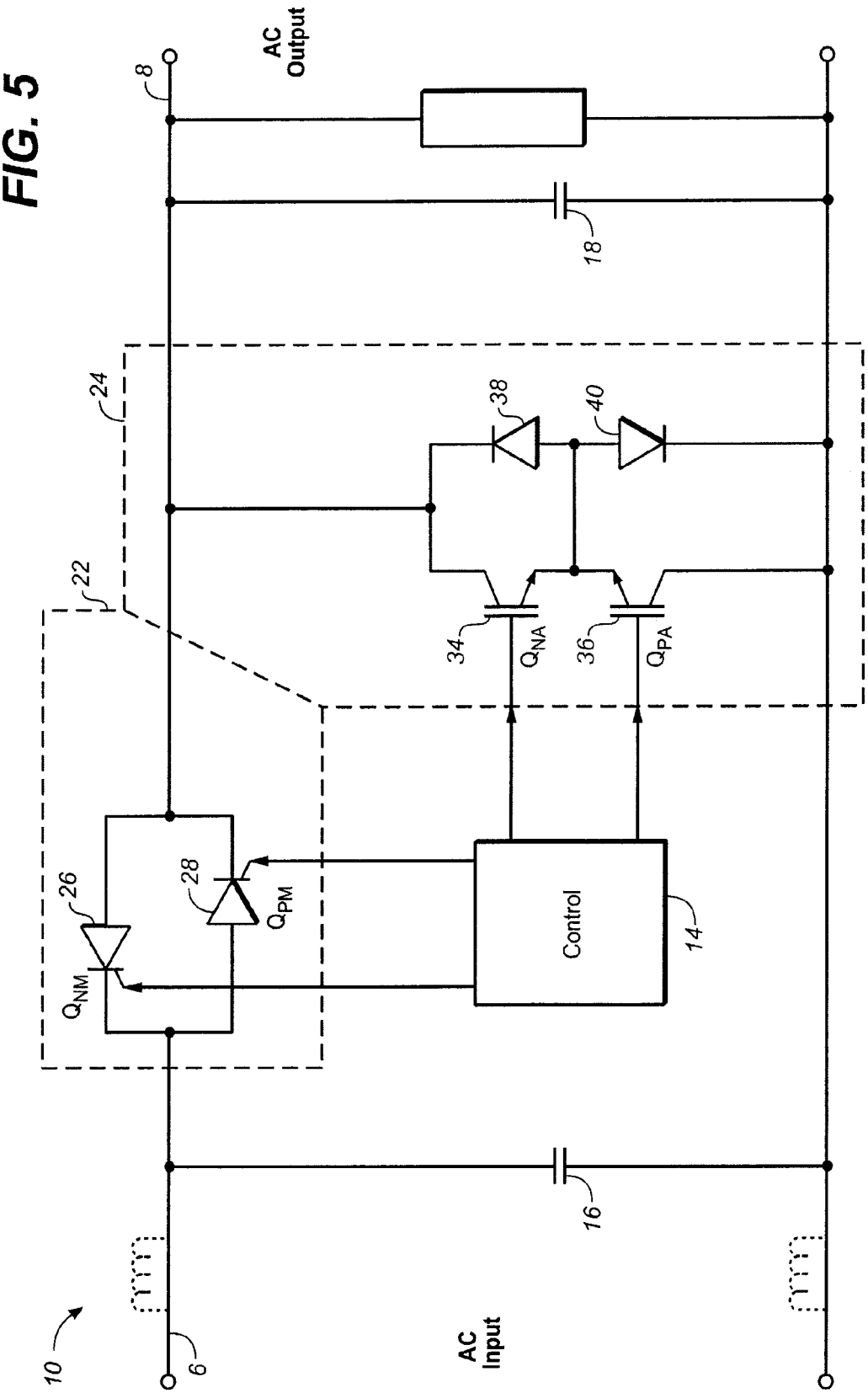
FIG. 5 is a schematic diagram of yet another exemplary implementation for a power converter system for AC voltage regulation, according to an embodiment of the invention.

FIG. 5 is a schematic diagram of still another exemplary implementation for a power converter system 10 for AC voltage regulation, according to an embodiment of the invention. Such power converter system 10 can be an AC-to-AC voltage regulator for regulating AC power. Power converter system 10 receives an AC input power from an AC power source at an input terminal 6, and delivers a controlled AC output power to a load at an output terminal 8. As shown, system 10 includes a main bi-directional switch 22, an auxiliary bi-directional switch 24, a control block 14, an input capacitor 16, and an output filter capacitor 18.

Main bi-directional switch 22 functions to support or provide control of the AC output voltage. As shown, main bi-directional switch 22 may be implemented with thryristors or SCRs 26, 28 (labeled Qnm and Qpm). Auxiliary bi-directional switch 24 functions to handle the reactive load by circulating current. Auxiliary bi-directional switch 24 may be implemented with transistors 34, 36 (labeled Qna and Qpa) and diodes 38, 40. As shown, transistors 34, 36 can be insulated gate bipolar transistors (IGBTs), but it is understood that any other suitable transistors can be used, such as, for example, metal-oxide-semiconductor field effect transistor (MOSFET), insulated gate field effect transistors (IGFETs), bipolar junction transistors (BJTs), etc. Each of SCRs 26, 28 in the main bi-directional switch 22 and transistors 34, 36 in the auxiliary bi-directional switch 24 receives a respective control signal for turning the SCR or transistor on and off.

Control block 14 is coupled to main and auxiliary bi-directional switches 22, 24. Control block 14 provides the control signals for SCRs 26, 28 and transistors 34, 36 for turning on and off the same. A separate control signal is provided for each of SCRs 26, 28 and transistors 34, 36. Control block 14 may be implemented in any suitable logic for providing control signals for turning on and turning off SCRs 26, 28 and transistors 34, 36 as described herein.

In operation, in one embodiment, the SCRs 26, 28 in main bi-directional switch 22 are turned on and off to generate a controlled AC output voltage from the AC input voltage. During each positive half-cycle for the power converter system 10, SCR 28 is turned on and SCR 26 is turned off in the main bi-directional switch 22. This allows AC input voltage to be applied to the load. When current flow is negative due to inductive load, SCR 28 is turned off, the transistor 34 in auxiliary bi-directional switch 24 is kept on, allowing inductive current flow. Transistor 34 and diode 40 circulate the negative current. Thus, the reactive load current is allowed to free wheel through the auxiliary bi-directional switch 24. This will reduce any voltage spikes in power converter system 10 to a safe limit. Transistor 34 is turned off just before SCR 28 is required to turn on to maintain output voltage. Any time during positive half cycle, before SCR 28 is turned on, the transistor 34 is turned off.

During each negative half-cycle for the power converter system 10, SCR 28 is kept off and SCR 26 is turned on at appropriate time in the main bi-directional switch 22. This allows AC input voltage to be applied to the load. Here when current flow is positive before SCR 26 is turned on (flowing from AC input voltage to AC output voltage) at the start of the cycle, the reactive current circulates through transistor 36 and diode 38. Thus, the reactive load current is allowed to free wheel through the auxiliary bi-directional switch 24. This will reduce any voltage spikes in power converter system 10 to a safe limit. Transistor 36 is turned off just before SCR 26 is required to turn on in order to maintain output voltage. Any time during negative half cycle, before SCR 26 is turned on, the transistor 36 is turned off.

By adding auxiliary or free wheeling bi-directional switch 24, the effect or reactive load and cable parasitic inductance can be reduced or eliminated in power converter system 10 as compared to previously developed designs. The output capacitor 18 will also help here. Similarly, input capacitor 16 will also help to reduce voltage spikes across main bi-directional switch 22 when this switch turns off. The embodiment of power converter system 10 thus reduces or eliminates some of the back EMF problem for lagging or leading load.

Figure 6:
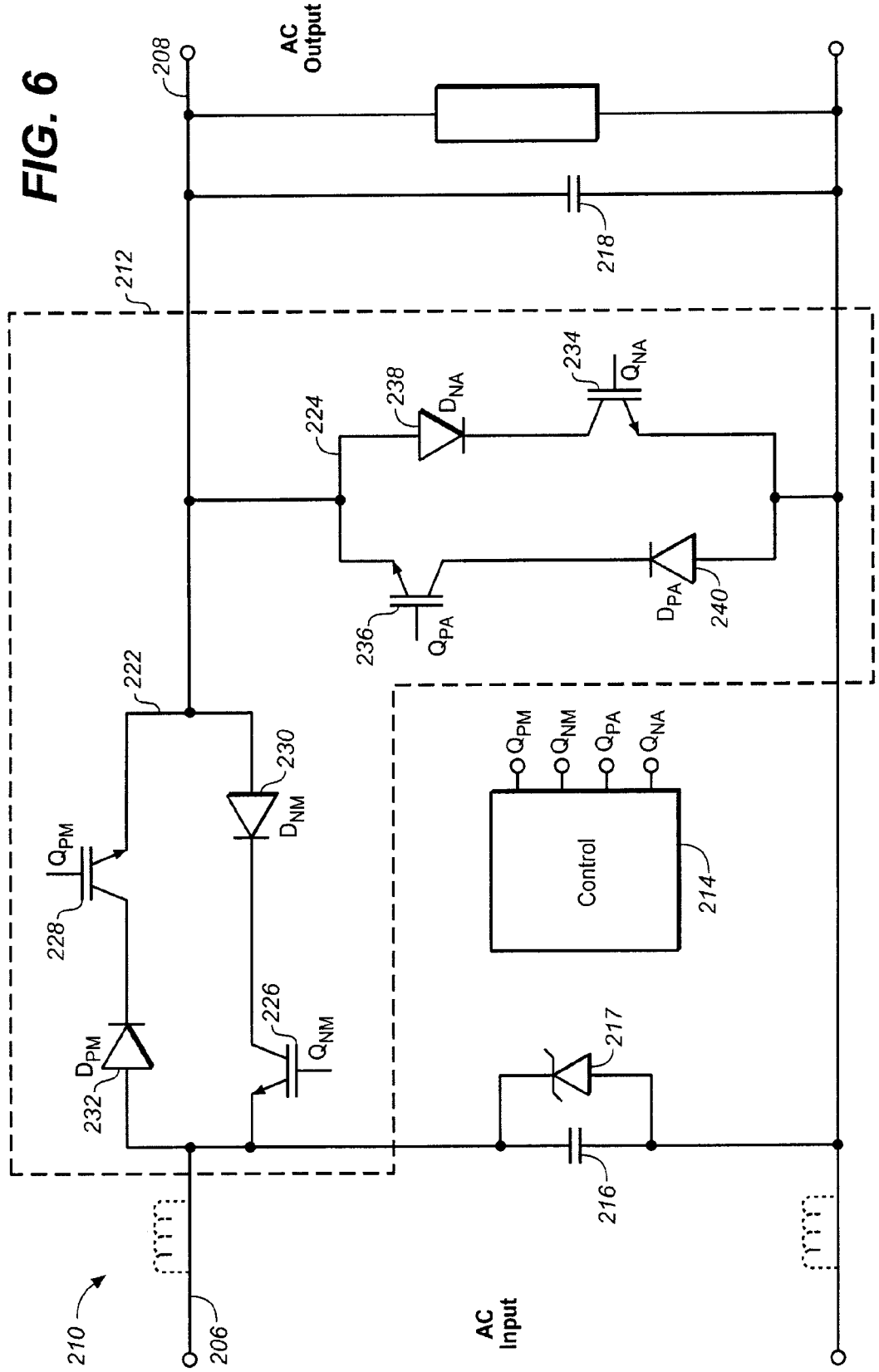
FIG. 6 is a schematic diagram of still another exemplary implementation for a power converter system for AC voltage regulation, according to an embodiment of the invention.

FIG. 6 is a schematic diagram of still another exemplary implementation for a power converter system 210 for AC voltage regulation, according to an embodiment of the invention. As shown, system 210 includes a chopper block 212, a control block 214, an input capacitor 216, and an input diode 217, and an output capacitor.

The chopper block 212 generally functions to support or provide control of the AC output voltage at least in part by "chopping" the AC input waveform. AC chopper circuit 212 comprises a main bi-directional switch 222 and an auxiliary bi-directional switch 224. Main bi-directional switch 222 may be implemented with transistors 226, 228 (labeled Qnm and Qpm), each of which is coupled in series to a respective diode 230 or 232 (labeled Dnm and Dpm). Transistors 226 and 228 each receive its own control signal. Similarly, auxiliary bi-directional switch 224 may be implemented with transistors 234, 236 (labeled Qna and Qpa), each of which is coupled in series with a respective diodes 238 or 240 (labeled Dna and Dpa). Transistors 234 and 236 each receives its own control signal. Each of transistors 226, 228, 234, 236 in main and auxiliary bi-directional switches 222, 224 can be implemented as any suitable transistor, such as IGBTs shown in FIG. 7, but alternatively, BJTs, IGFETs, MOSFETs, etc.

Control block 214 is coupled to main and auxiliary bi-directional switches 222, 224. Control block 214 provides the control signals for transistors 226, 228, 234, 236 for turning on and off the same. A separate control signal is provided for each of transistors 226, 228, 234, 236, thus allowing the transistors to be individually controlled. The control provided by control block 214 can be PWM control for at least some of the transistors. Control block 214 may be implemented in any suitable logic for providing control signals for turning on and turning off transistors 226, 228, 234, 236 as described herein In one embodiment, the operation for power converter system 210 shown in FIG. 6 can be similar to the operation for power converter system 410 shown in FIG. 1. Because of the similarity of operation between power converter system 210 shown in FIG. 6 and power converter system 410 shown in FIG. 1, the exemplary waveform diagram 300 of FIG. 2 is equally applicable for the system 210. In such case, the waveforms 302, 304, 306, 308, 310, and 312 shown in FIG. 2 may generally represent, respectively, the input line voltage at input terminal 206, the output line voltage at output terminal 208, the control signal applied to transistor 228 (Qpm), the control signal applied to transistor 226 (Qnm), the control signal applied to transistor 236 (Qpa), and the control signal applied to transistor 234 (Qna).

As shown, chopping is only achieved for a portion of each half-cycle of operation in power converter system 210.

In various embodiments, all or a portion of power converter systems 410, 510, 10, 110, and 210, shown in FIGS. 1, 3, and 5, and 6 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals therebetween. In one embodiment, any of control block 414, 514, 14, or 214 can implemented on one die, for example, using microprocessors or digital signal processors (DSPs). Exemplary control logic signals generated by such circuitry are shown in FIGS. 3 and 5.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A power converter system for AC voltage regulation comprising:
    an input terminal for receiving an AC input voltage;
    an output terminal at which an AC output voltage of the power converter system is provided to a load;
    a main bi-directional switch coupled between the input terminal and the output terminal, the main bi-directional switch operable to control the provision of the AC output voltage, wherein a reactive current flows through the main bi-directional switch if the load is reactive; and
    an auxiliary bi-directional switch coupled to the output terminal and operable to circulate the reactive current due to the reactive load, thereby reducing any voltage spikes in the power converter system.

2. The power converter system of claim 1 comprising a control block coupled to the main bi-directional switch and the auxiliary bi-directional switch, the control block operable to provide control signals to the main and auxiliary bi-directional switches.

3. The power converter system of claim 1 wherein the main bi-directional switch comprises at least one thryristor operable to be turned on and off for generating the AC output voltage from the AC input voltage.

4. The power converter system of claim 1 wherein the main bi-directional switch comprises at least one transistor operable to be turned on and off for generating the AC output voltage from the AC input voltage.

5. The power converter system of claim 1 wherein the main bi-directional switch comprises at an AC chopper block.

6. The power converter system of claim 1 wherein at least one PWM control signal is applied to the main bi-directional switch to control the provision of the AC output voltage.

7. The power converter system of claim 1 wherein at least one PWM control signal is applied to the auxiliary bi-directional switch to control the circulation of the reactive current.

8. The power converter system of claim 1 wherein the main bi-directional switch comprises at least one transistor operable to be turned on and off for generating the AC output voltage from the AC input voltage, and wherein the auxiliary bi-directional switch comprises at least one transistor operable to be turned on and off to control the circulation of the reactive current.

9. In a power converter system, a method for AC voltage regulation comprising:
    receiving an AC input voltage at an input terminal;
    controlling the provision of an AC output voltage to a load at an output terminal using a main bi-directional switch coupled between the input terminal and the output terminal, wherein a reactive current flows through the main bi-directional switch if the load is reactive;
    and
    circulating the reactive current due to the reactive load through an auxiliary bi-directional switch coupled to the output terminal, thereby reducing any voltage spikes in the power converter system.

10. The method of claim 9 wherein the main bi-directional switch comprises at least one thryristor operable to be turned on and off for generating the AC output voltage from the AC input voltage.

11. The method of claim 9 wherein the main bi-directional switch comprises at least one transistor operable to be turned on and off for generating the AC output voltage from the AC input voltage.

12. The method of claim 9 wherein the main bi-directional switch comprises at an AC chopper block.

13. The method of claim 9 wherein controlling the provision of an AC output voltage comprises providing at least one PWM control signal to the main bi-directional switch.

14. The method of claim 9 wherein circulating the reactive current comprises providing at least one PWM control signal to the auxiliary bi-directional switch.

15. A power converter system for AC voltage regulation comprising:
    an input terminal for receiving an AC input voltage;
    an output terminal at which an AC output voltage of the power converter system is provided to a load;
    a main bi-directional switch coupled between the input terminal and the output terminal, the main bi-directional switch comprising at least one transistor operable to be turned on and off for controlling the provision of the AC output voltage, wherein a reactive current flows through the main bi-directional switch if the load is reactive; and
    an auxiliary bi-directional switch coupled to the output terminal and comprising at least one transistor operable to be turned on and off for circulating the reactive current due to the reactive load, thereby reducing any voltage spikes in the power converter system.

16. The power converter system of claim 15 comprising a control block coupled to the main bi-directional switch and the auxiliary bi-directional switch, the control block operable to provide control signals to the at least one transistor of each of the main and auxiliary bi-directional switches.

17. The power converter system of claim 16 wherein at least one of the control signals provided by the control block is a PWM control signal.

18. The power converter system of claim 16 comprising circuitry for sensing a current vector, wherein the control block adjusts the control signals in response to the current vector sensing circuitry.

19. The power converter system of claim 15 comprising circuitry for sensing the output voltage, wherein the control block adjusts the control signals in response to the output voltage sensing circuitry.

* * * * *